(12) United States Patent
Waltenberg et al.

(10) Patent No.: US 7,789,924 B2
(45) Date of Patent: Sep. 7, 2010

(54) FILTER SYSTEM FOR AN INTERNAL COMBUSTION ENGINE OF A MOTOR VEHICLE

(75) Inventors: Klaus Waltenberg, Großbottwar (DE); Robert Zbiral, Marbach (DE)

(73) Assignee: Mann + Hummel GmbH, Ludwigsburg (DE)

(*) Notice: Subject to any disclaimer, the term of this patent is extended or adjusted under 35 U.S.C. 154(b) by 287 days.

(21) Appl. No.: 11/873,499

(22) Filed: Oct. 17, 2007

(65) Prior Publication Data

US 2008/0092500 A1 Apr. 24, 2008

(30) Foreign Application Priority Data

Oct. 20, 2006 (DE) .................. 10 2006 050 473

(51) Int. Cl.
*B01D 46/00* (2006.01)
(52) U.S. Cl. .................. 55/385.3; 55/495; 55/503; 123/198 E
(58) Field of Classification Search .............. 55/385.3, 55/493, 497, 502, 503, 495, 486; 123/198 E; 403/364, 374.5; 96/380, 381, 383; 180/68.3
See application file for complete search history.

(56) References Cited

U.S. PATENT DOCUMENTS

| | | | |
|---|---|---|---|
| 4,110,876 A * | 9/1978 | Weiss et al. .................. 28/271 |
| 5,297,990 A * | 3/1994 | Renz et al. .................. 454/187 |
| 5,579,858 A * | 12/1996 | Petersen et al. ............ 180/68.3 |
| 6,024,188 A | 2/2000 | Yamaguchi et al. |
| 6,736,871 B1 * | 5/2004 | Green et al. ................ 55/385.3 |
| 7,459,004 B2 * | 12/2008 | Miyake et al. ............. 55/385.3 |
| 7,507,279 B2 * | 3/2009 | Mizutani et al. .............. 96/135 |
| 2008/0282654 A1 * | 11/2008 | Matschl et al. ............. 55/385.3 |
| 2009/0126324 A1 * | 5/2009 | Smith et al. ................ 55/385.3 |

FOREIGN PATENT DOCUMENTS

| | | |
|---|---|---|
| DE | 100 28 856 A | 1/2002 |
| DE | 10314220 A1 | 10/2004 |
| GB | 2 235 283 A | 2/1991 |
| WO | 2006051072 A1 | 5/2006 |

* cited by examiner

*Primary Examiner*—Duane Smith
*Assistant Examiner*—Minh-Chau T Pham

(57) ABSTRACT

A filter system for an internal combustion engine of a motor vehicle has a housing with a top housing part and a bottom housing part. A filter element is arranged inside the housing. An unfiltered air connector is connected to the housing. A clean air connector is connected to the housing The top housing part has a support grate embedded in foam material. The support grate and the foam material are configured such that bending of the top housing part in a direction of the bottom housing part is ensured when a load is applied.

11 Claims, 3 Drawing Sheets

FILTER SYSTEM FOR AN INTERNAL COMBUSTION ENGINE OF A MOTOR VEHICLE

BACKGROUND OF THE INVENTION

The invention relates to a filter system for an internal combustion engine of a motor vehicle. The filter system is comprised of an unfiltered air inlet, a clean air outlet, a housing, and a filter element arranged in the housing.

German patent application 100 28 856 discloses a filter arrangement arranged underneath the engine hood. This filter arrangement has an energy absorbing structure into which structure the fresh air supply channel and the filter arrangement are spatially integrated. The energy absorbing structure is provided in order to dampen the impact of a pedestrian in case of an accident. The energy absorbing structure ensures also a reduction of the sound emission in the upward direction so that a sound proofing mat arranged at the underside of the engine hood is not needed. A disadvantage of this known arrangement is that as a result of the structure a significant proportion of the space available for the filter is lost. This space is required in order to achieve sound proofing properties like those of a Helmholtz resonator.

Great Britain patent application 2 235 283 discloses an engine hood for a passenger car. In order to not have to arrange a hood scoop for fresh air in the area of the top side of the engine hood and in order to reduce the dangers resulting from such a hood scoop in case of an accident involving a pedestrian, a fresh air supply channel including the corresponding filter arrangement is mounted on an underside of the outer skin of the engine hood. However, this provides only minimal improvement with regard to impact protection.

SUMMARY OF THE INVENTION

It is an object of the present intention to provide a filter-system for an internal combustion engine of a motor vehicle that provides optimal pedestrian impact protection under the engine hood and moreover ensures that the engine hood can transmit deformation and is optimally dampened.

In accordance with the present invention, this is achieved in that the filter system is comprised of a top housing part and a bottom housing part wherein the top housing part has a support grate that is embedded in foam material and wherein the support grate ensures that the top housing part can bend in the direction toward the bottom housing part when a force (load) is acting on it.

According to one embodiment of the invention, a support frame extends along the joining area between the top housing part and the bottom housing part. This means that at locations where a relatively dimensionally stable fastening structure is required, the support frame provides such a structure while the area of the top housing part that has only housing functions is yielding or flexible.

According to another embodiment, the support frame has a wave structure (undulated structure) wherein the wave structure during the production process ensure an excellent distribution of the foam material, i.e., flowing of the material before the hardening process or curing process and even distribution about the support frame are ensured.

According to yet another embodiment of the invention, it is provided that the top housing part is configured to have projecting supports, i.e., cylindrical supports, wherein at least some extend or project to the bottom surface of the bottom housing part and can rest against the bottom housing part. These projecting supports have the task of receiving a force or load acting on the top housing part and of transmitting the force or load into the bottom housing part.

In one particular embodiment, the top housing part as well as the bottom housing part are comprised of polyurethane foam. Advantageously, the foam thickness of the top wall of the top housing part is 10 mm to 20 mm.

A filter element is preferably arranged between the top housing part and the bottom housing part. The filter element separates the clean air part from the raw or unfiltered air part and enables filtering of the taken-in air. Of course, the top housing part and the bottom housing part can also be designed simply as a resonance chamber that has only sound-proofing properties.

In one embodiment, the filter element is comprised of a hose-shaped filter wherein the hose has a support member in order to maintain the structure of the hose even at great differential pressures.

BRIEF DESCRIPTION OF THE DRAWING

The features of the invention will become apparent in more detail from the following description and accompanying drawings.

DESCRIPTION OF THE PREFERRED EMBODIMENTS

Figure 1:
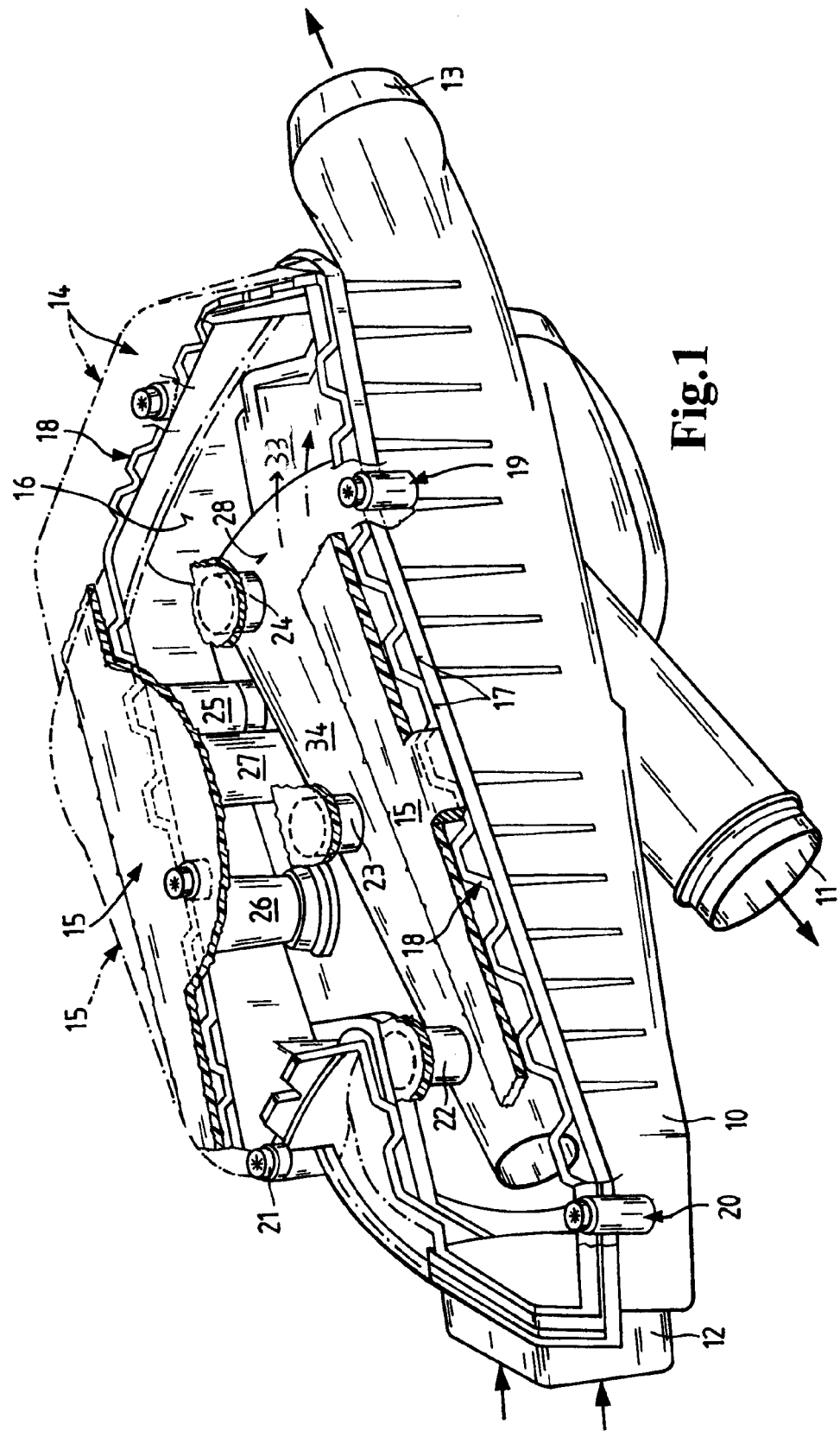
FIG. 1 shows a filter system according to the present invention with top housing part partially broken away to show the interior.

The filter system for an internal combustion engine according to FIG. 1 is comprised of a bottom housing part 10, a connector 11 for clean air to be distributed; and a connector 12 for the supplied raw (unfiltered) air. In the present embodiment, a further connector 13 for distributing clean (filtered) air is provided. The top housing part 14 is broken away partially in order to allow a view of the interior of the housing 35. This top housing part 14 is comprised of a foam material, in particular polyurethane foam such as polyurethane hard foam (PUR-MDI; MDI=diphenylmethane-4,4'-diisocyanate); the top wall 15 has a material thickness of approximately 10 to 20 mm and the lateral walls 16 have a material thickness of 5 mm to 10 mm, preferably approximately 8 mm. The polyurethane foam can be coated with a plastic film.

In the area of the joining plane 17, i.e., in the joint between top housing part 14 and bottom housing part 10, a seal or gasket is provided. Within the top housing part 14 in the area of the joining plane 17 a support frame 18 is provided that is wave-shaped (undulated), in particular, as illustrated, in that webs extend, starting at the joining plane, upwardly or downwardly. As shown in the drawing FIG. 2, the wave-shaped structure of the frame 18 has waves that extend such that wave troughs are proximal to the joint or the joining plane 17 between the top housing part and the bottom housing part and that wave peaks are remote from the joining plane 17 between the top housing part and the bottom housing part. As an alternative, the support frame can be designed such that it extends along the joining plane inwardly and outwardly in order to achieve during manufacture of the top housing part, i.e., when the support frame is coated with foam or embedded in foam, an improved flow behavior of the polyurethane foam. It is also possible that a further wave-shaped structure is superimposed on the wave-shaped structure 18 in the direction of the joining line between the top housing part and the bottom housing part.

As already mentioned, the support frame 18 is located within the lateral walls 16 and is therefore embedded completely within the polyurethane foam. The connection between top housing part 14 and bottom housing part 10 is realized by suitable screw connections 19, 20, 21 three of which are illustrated.

The top housing part 14, as schematically illustrated, is provided with projecting supports 22, 23, 24, 25, 26, 27 that extend inwardly into the interior of the housing. The projecting supports 22, 23, 24 have a relatively short length and extend only into the area in which a hose-shaped filter element 34 is arranged while the projecting supports 25, 26, 27 extend to the bottom surface of the bottom housing part 10.

The air to be cleaned (filtered) flows through the connector 12 into the housing, passes through the exterior sleeve 28 of the filter element 34, and exits through the clean air channel 33 and connectors 11, 13 from the housing 35.

Figure 2:
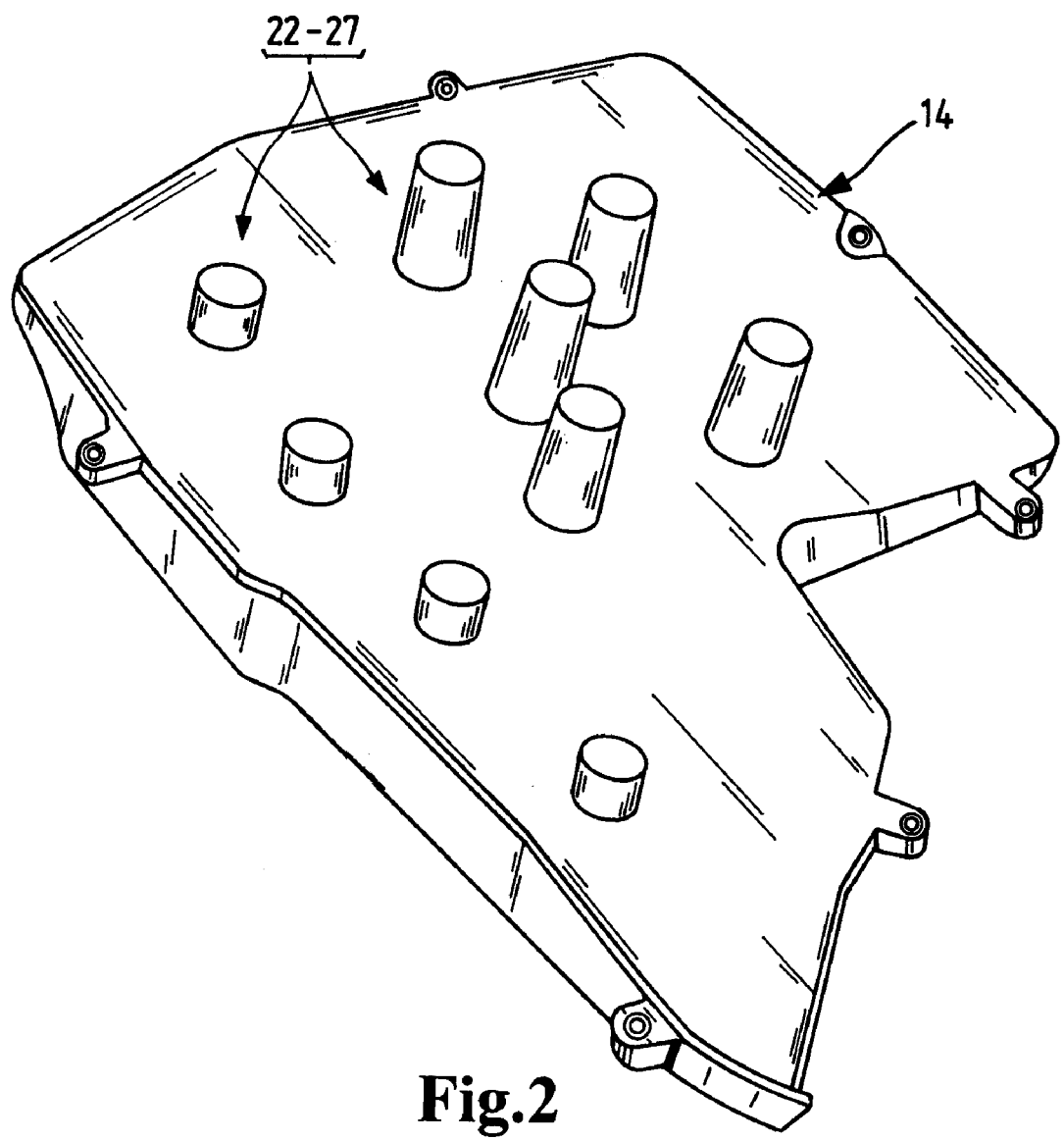
FIG. 2 shows the interior of the top housing part of FIG. 1.

FIG. 2 shows the interior of the top housing part 14. Same parts are referenced with same reference numerals. This view illustrates also the projecting supports in particular the row that is located above the filter element 34 and thus has a minimal height as well as the projecting supports that extend to the bottom surface of the bottom housing part. These projecting supports have the task of receiving the load created by an impact on the top housing part 14, of absorbing the load partially by compression and deformation, and of partially transmitting the load onto the bottom housing part that also receives and absorbs kinetic energy. As a result of the configuration, i.e., the thickness and the number of projecting supports, an optimal damping of the impact can be achieved.

Figure 3:
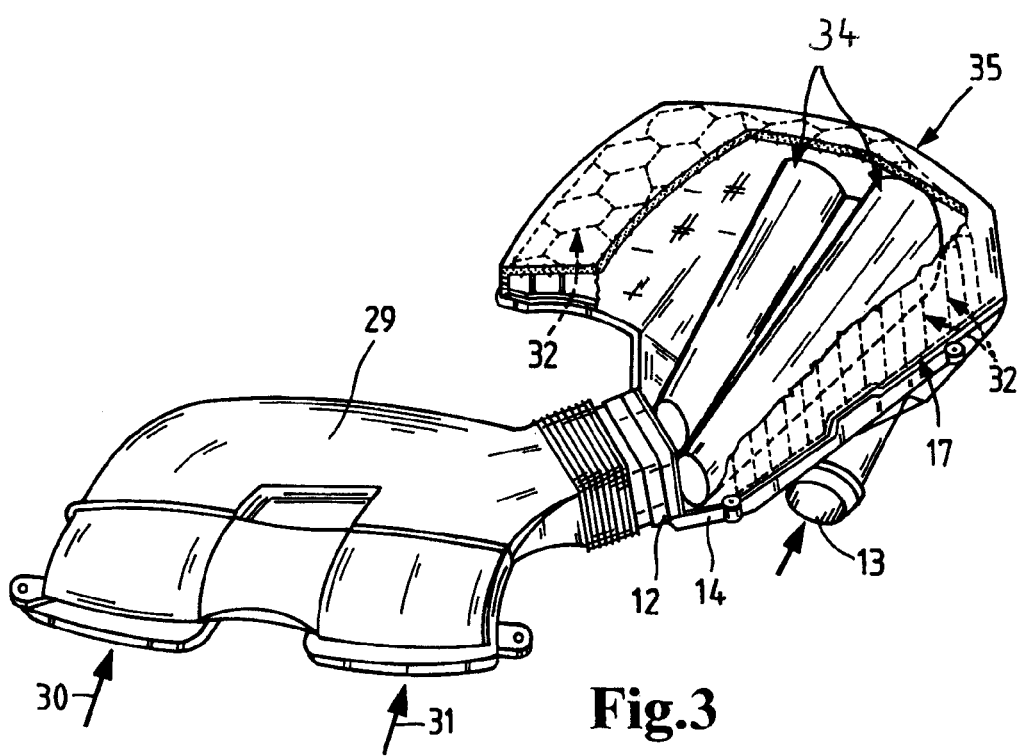
FIG. 3 is a view of the exterior of the filter system with attached air intake channel.

FIG. 3 shows a view of the exterior of the entire system in which not only the filter housing is illustrated but also an intake channel 29 for unfiltered air that is divided into two unfiltered air inlets 30, 31. Usually, the raw (unfiltered) air inlets are provided at the front end of the motor vehicle. The filter housing 35 is illustrated with raw air connector 12 and a clean air connector 13. The top housing part 31 shows a variant of the invention according to which in addition to the projecting supports, or instead of the projecting supports, a support grate 32 is provided that is embedded in polyurethane foam; it is shown as a grate in dashed lines only for the purpose of simplifying the drawing. The support grate 32 also serves for absorbing energy that is introduced by impact so as to prevent that the polyurethane foam fractures. As already mentioned, the support grate can be an alternative to the projecting supports. Even if no support grate is used, there is still the support frame according to FIG. 1 in the area of the joining plane 17 for strengthening the housing 35.

The specification incorporates by reference the entire disclosure of German priority document 10 2006 050 473.9 having a filing date of Oct. 20, 2006.

While specific embodiments of the invention have been shown and described in detail to illustrate the inventive principles, it will be understood that the invention may be embodied otherwise without departing from such principles.

What is claimed is:

1. A filter system for an internal combustion engine of a motor vehicle, the filter system comprising:
    a housing comprised of
        a top housing part and
        a bottom housing part;
    a filter element arranged inside the housing;
    an unfiltered air connector attached to the housing;
    a clean air connector attached to the housing;
    wherein the top housing part has a support grate embedded in foam material;
    wherein the support grate and the foam material are configured such that compression of said housing by bending of the top housing part in a direction of the bottom housing part is ensured when engine hood deforms against said top housing part under an impact load;
    wherein the housing comprises a support frame that extends along a joint between the top housing part and the bottom housing part;
    wherein the support frame has a wave-shaped structure; and
    wherein the wave-shaped structure extends such that wave troughs are proximal to the joining plane between the top housing part and the bottom housing part and wave peaks are remote from the joining plane between the top housing part and the bottom housing part.

2. The filter system according to claim 1, wherein a further wave-shaped structure is superimposed on the wave-shaped structure in a direction of a joining line between the top housing part and the bottom housing part.

3. The filter system according to claim 1, wherein
    the top housing part comprises a top wall and lateral walls
    wherein the top wall has a material thickness of 10 to 20 mm and
    wherein the lateral walls have a material thickness in the range of 5 mm to 10 mm.

4. The filter system according to claim 1, wherein
    the top housing part has projecting supports oriented toward the bottom housing part,
    wherein at least some of the projecting supports extend to a bottom surface of the bottom housing part and rest against the bottom housing part.

5. The filter system according to claim 1, wherein the top housing part is comprised of a polyurethane foam.

6. The filter system according to claim 5, wherein the polyurethane foam is a hard foam that is covered with a plastic film.

7. The filter system according to claim 1, wherein the bottom housing part is comprised of a polyurethane foam.

8. The filter system according to claim 7, wherein the polyurethane foam is a hard foam that is covered with a plastic film.

9. The filter system according to claim 1, wherein the filter element is arranged between the top housing part and the bottom housing part and separates a clean air part from an unfiltered air part of the housing and effects filtration of taken-in air.

10. The filter system according to claim 9, wherein the filter element is a hose-shaped filter element.

11. The filter system according to claim 8, wherein the filter element is comprised of a hose and a support member arranged within the hose, wherein the support member is yielding.

* * * * *